(12) United States Patent
Faraj

(10) Patent No.: US 7,518,620 B2
(45) Date of Patent: Apr. 14, 2009

(54) METHOD OF DISPLAYING LOCAL AND REMOTE DATA OBJECTS AND OF INTERACTING WITH SAME

(75) Inventor: Mazen Faraj, North York (CA)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 10/718,301

(22) Filed: Nov. 20, 2003

(65) Prior Publication Data

US 2004/0268364 A1    Dec. 30, 2004

(30) Foreign Application Priority Data

Jun. 26, 2003    (CA)    ................................... 2433523

(51) Int. Cl.
*G09G 5/00* (2006.01)
*G06F 15/16* (2006.01)
(52) U.S. Cl. ....................... 345/629; 709/219
(58) Field of Classification Search ......... 345/629–641, 345/440; 715/733, 738, 748, 736; 709/201, 709/217, 218, 219
See application file for complete search history.

(56) References Cited

U.S. PATENT DOCUMENTS 5,008,853 A * 4/1991 Bly et al. ..................... 715/751
5,388,196 A * 2/1995 Pajak et al. .................. 715/751
6,457,065 B1 * 9/2002 Rich et al. ................... 719/328
2002/0073078 A1 * 6/2002 Ku et al. ......................... 707/3
2004/0019640 A1 * 1/2004 Bartram et al. ............. 709/205

OTHER PUBLICATIONS

Sun, Chengzheng and David Chen. "Consistency Maintenance in Real-Time Collaborative Graphics Editing Systems". ACM Trans. on Comp.-Human Interactions (TOCHI), vol. 9, Issue 1, Mar. 2002, pp. 1-41.*

Gifford, D.; Needham, R.; Schroeder, M. "The Cedar File System." Comm. of the ACM, vol. 31, Issue 3 (Mar. 1988), pp. 288-298.*

* cited by examiner

*Primary Examiner*—Ryan R Yang
(74) *Attorney, Agent, or Firm*—Volel Emile; Herman Rodriguez

(57) ABSTRACT

A method for display of and interaction with local and remote data objects in a distributed data processing system is disclosed. In an embodiment, given sufficient information or "meta data" (i.e. data about data) for a local system and a remote system, a data object viewer may combine both local and remote data objects in a single view. In an embodiment, a user may interact with these local and remote data objects in a context sensitive manner such that, in dependence on the selected data object, either a local action, a remote action, or both local and remote actions may be performed on the selected data object.

7 Claims, 12 Drawing Sheets

METHOD OF DISPLAYING LOCAL AND REMOTE DATA OBJECTS AND OF INTERACTING WITH SAME

CROSS-REFERENCE TO RELATED APPLICATIONS

The present invention is related to the following pending U.S. patent applications.

Ser. No. 10/285,996, filed Oct. 31, 2002, entitled, EDITING FILES OF REMOTE SYSTEMS USING AN INTEGRATED DEVELOPMENT ENVIRONMENT;

Ser. No. 10/285,993, filed Jan. 1, 2004, entitled, Accessing A REMOTE ISERIES OR AS/400 COMPUTER SYSTEM FROM AN INTEGRATED DEVELOPMENT ENVIRONMENT;

Ser. No. 10/286,559, filed Jan. 1, 2004, entitled, FRAMEWORK TO ACCESS A REMOTE SYSTEM FROM AN INTEGRATED DEVELOPMENT ENVIRONMENT;

Ser. No. 10/090,341, filed Sep. 4, 2003, entitled, DEBUG OF CODE WITH SELECTIVE DISPLAY OF DATA; and Ser. No. 10/055,690, filed Jul. 31, 2003, entitled, VIRTUAL PRIVATE NETWORK AND TUNNEL GATEWAY WITH MULTIPLE OVERLAPPING, REMOTE SUBNETS.

BACKGROUND

The present invention relates to data processing systems, and more specifically to the display of and interaction with local and remote data objects.

In a typical distributed data processing system, there are many situations where a user may need to display and interact with both local and remote data objects. Local and remote data objects may include, for example, files and folders located locally and remotely. Typical actions performed on these local and remote data objects may include, for example, editing, deleting, copying, moving, renaming, and in the case of program files and executable files, compiling and running.

Known data object viewers typically display either all local or all remote data objects in a single view. When interacting with remote data objects presented in such a view, two approaches have been commonly used. In a first approach, an action on a remote data object is invoked directly on the remote system, for example by programming a customized remote action. In a second approach, a remote data object is "pulled" or downloaded to a local system, acted upon locally, and then "pushed" or uploaded back to the remote system. For example, there are Windows-based code editors, which allow for local editing of remote files. Typically, this is done by downloading a temporary copy of the remote files to a local system, allowing the files to be edited locally, and then subsequently pushing the edited files back to the remote system.

It would be desirable to provide a more flexible approach to displaying and interacting with local and remote data objects.

SUMMARY

The present invention relates to display of and interaction with local and remote data objects in a distributed data processing system. In an embodiment, given sufficient information or "meta data" (i.e. data about data) for a local system and a remote system, a data object viewer may combine both local and remote data objects in a single view.

In an exemplary embodiment, a user may interact with these local and remote data objects in a context sensitive manner such that, in dependence on the selected data object, a local action, a remote action, or both local and remote actions may be performed on the selected data object.

In an exemplary embodiment, a data object having both a local presence and a remote presence may have both local and remote actions performed thereon in a context sensitive manner.

In an aspect of the invention, there is provided a method of displaying and interacting with local and remote data objects in a distributed data processing system, comprising:

(i) accessing a local model defining at least one local data object and at least one local action, which may be performed on, said local data object;

(ii) accessing a remote model defining at least one remote data object and at least one remote action, which may be performed on, said remote data object;

(iii) displaying at least one of said local data objects and said remote data objects in a viewer;

(iv) in response to selection of a data object from said viewer in (iii), determining a location characteristic for said selected data object;

(v) in the context of said location characteristic determined in (iv), performing at least one action on said selected data object, as defined by one of said local model and said remote model.

In an embodiment of the first aspect of the invention, the method further comprises:

(vi) defining a local/remote data object comprising a local data object and a remote data object and displaying said local/remote data object in said viewer in (iii);

(vii) if said local/remote data object is selected in (iv), then in (v) performing at least one action on said selected local/remote data object as defined by at least one of said local model and said remote model.

The foregoing and other aspects of the invention will be apparent from the following more particular descriptions of exemplary embodiments of the invention.

BRIEF DESCRIPTION OF THE DRAWINGS

In the figures which illustrate exemplary embodiments of the invention.

DETAILED DESCRIPTION OF EXEMPLARY EMBODIMENTS

Figure 1:
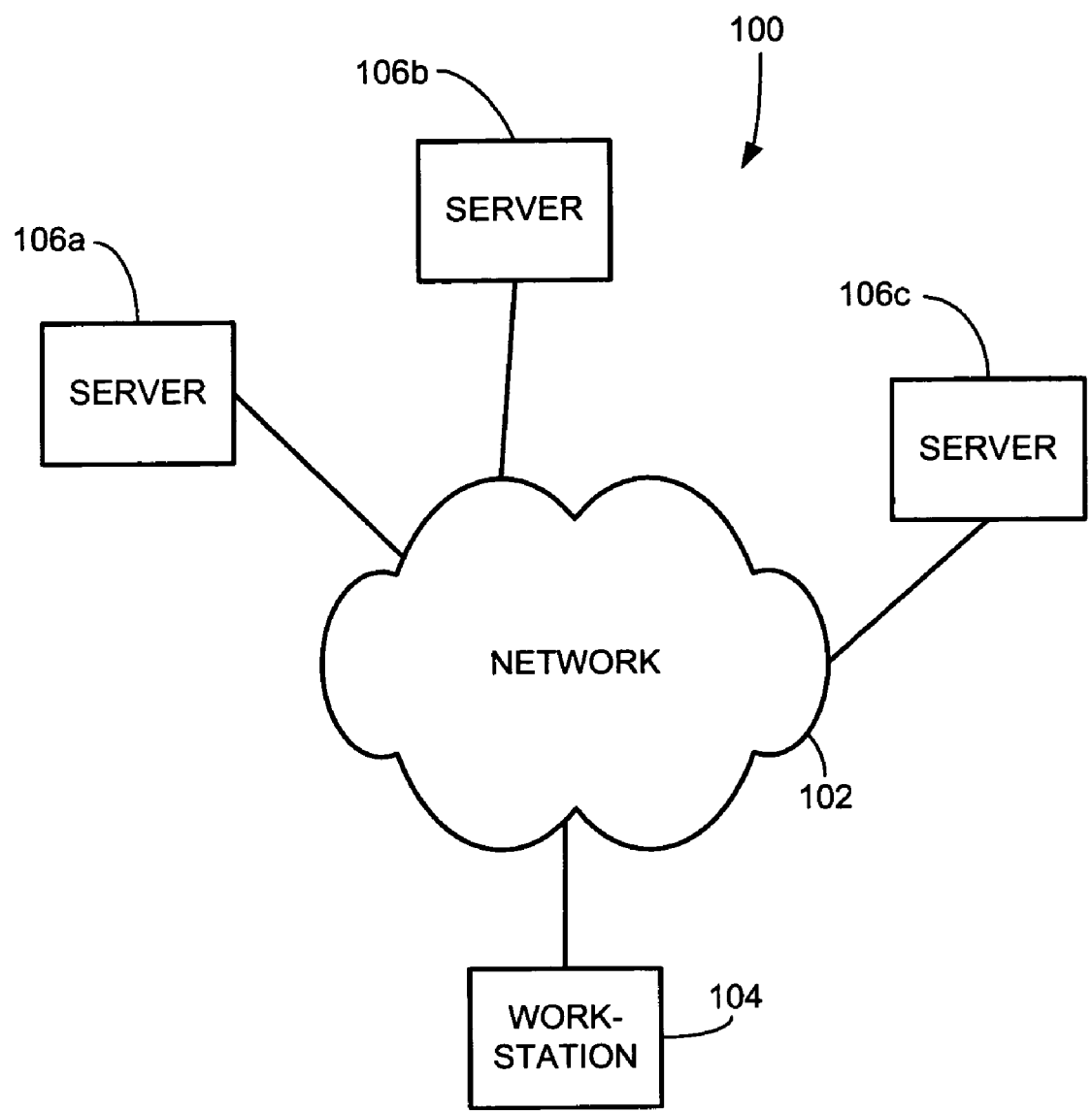
FIG. 1 shows an illustrative distributed data processing system, which may provide an operating environment for various exemplary embodiments.

FIG. 1 shows an illustrative distributed data processing system 100 which may provide an operating environment for various exemplary embodiments of the invention. As shown, a network 102 connects a workstation 104 and a plurality of servers 106a-106c. In the context of the present discussion, the workstation 104 may be viewed as a "local" system, and each of the servers 106a-106c may be viewed as a "remote" system. It will be appreciated that the system 100 shown in FIG. 1 is illustrative and is not meant to be limiting in terms of the type of system 100 which may provide a suitable operating environment to practice the invention.

Figure 2:
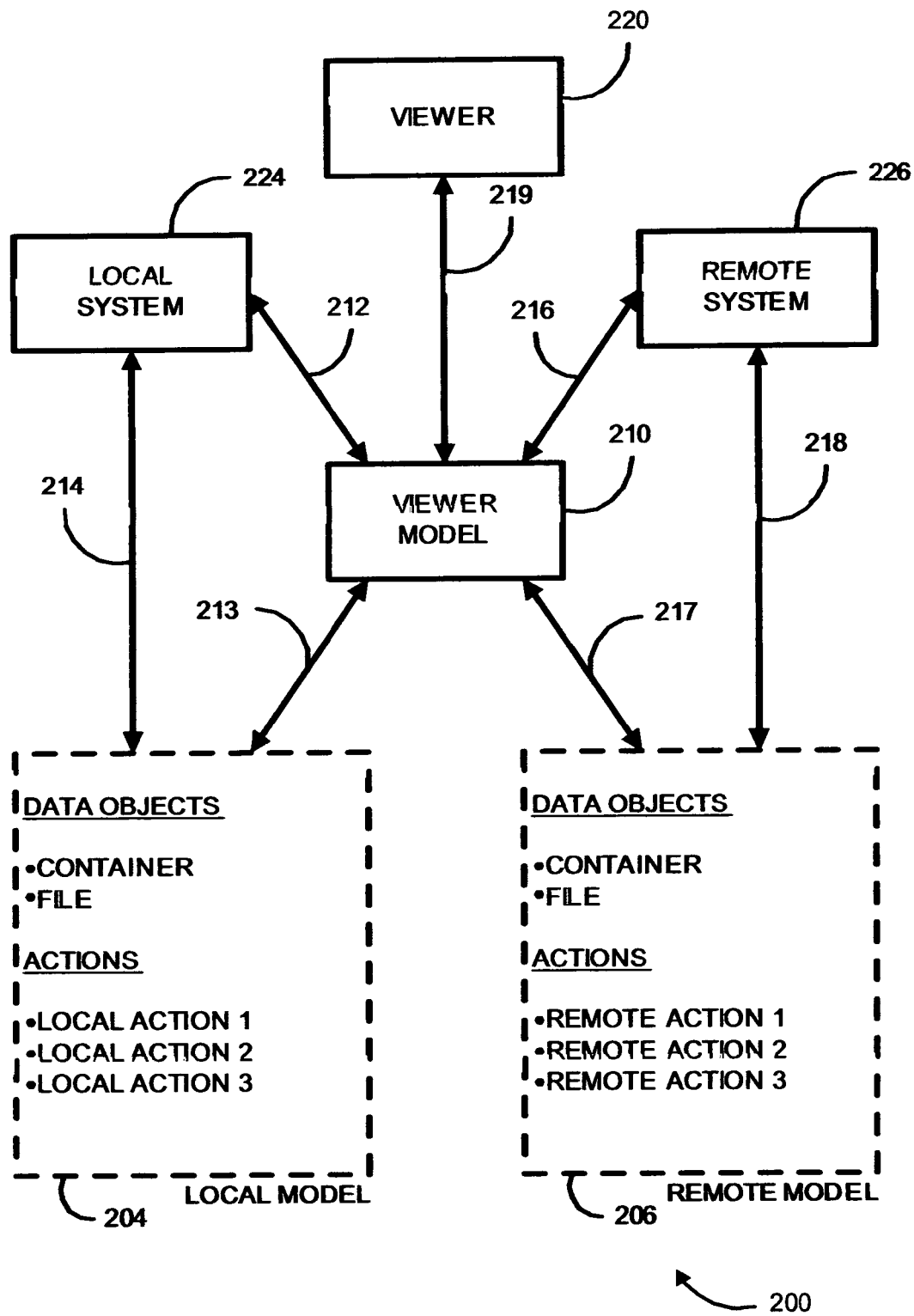
FIG. 2 shows a schematic block diagram of a system and method in accordance with an exemplary embodiment.

FIG. 2 shows a schematic block diagram of a system and method 200 in accordance with an exemplary embodiment. As shown, a viewer model 210 is connected to both a local system 224 and a remote system 226, via access paths 212 and 216, respectively.

In an embodiment, the viewer model 210 may be embodied as a process, and may be situated locally on the local system 224 (e.g. on the workstation 104 of FIG. 1). In such a case, access path 212 may be internal to the local system 224, while access path 216 may take a more circuitous route through the network 102 (FIG. 1).

As shown in FIG. 2, a local model 204 may be used to define local data objects located on the local system 224. Thus, the local model 204 is "meta data" which describes data objects and actions on local system 224. In an embodiment, the local model 204 may be accessible to the viewer model 210 via an access path 213, and the local model 204 may be accessible to the local system 224 via an access path 214. In an embodiment, the local model 204 may be co-located with the local system 224 and the viewer model 210 (e.g. in the workstation 104 of FIG. 1, for example).

In an embodiment, the local model 204 may define various local data objects including "containers", and "files". These containers and files may correspond to "folders", and "files" in a personal computer operating system, for example. The local model 204 may also define various actions, which may be performed locally on each of the defined local data objects. Thus, each local data object may have a set of valid local actions that may be performed on it. The local actions may be routines, which may be called from an underlying operating system, or customized routines programmed by the user. It will be appreciated that the set of valid local actions may vary, depending on the type of local data object and its definition in the local model 204.

In an embodiment, a corresponding remote model 206 may define remote data objects on the remote system 226. Thus, the remote model 206 is "meta data" which describes data objects and actions on the remote system 226. In an embodiment, the remote model 206 may be accessible to the viewer model 210 via an access path 217, and the remote model 206 may be accessible to the remote system 226 via an access path 218. In an embodiment, the remote model 206 may be co-located with the remote system 226 and access path 217 is a path across a network (e.g. network 102 of FIG. 1) to the remote system 226.

In an embodiment, the remote model 206 may define substantially the same types of data objects as defined by local model 204. Thus, the remote data objects may also comprise "containers" and "files", for example. However, it will be appreciated that the local and remote data objects need not be identical. For example, a "container" defined on a local system 224 may correspond to a "folder" on a remote system 226 having a different data structure or operating system. In any event, each remote data object may have a set of valid remote actions that may be performed on it. These remote actions may be routines, which may be called from an underlying operating system, or customized routines programmed by the user.

In an embodiment, the local model 204 and the remote model 206 may be "merged" in the viewer model 210, so that both the local model 204 and the remote model 206 (i.e. the meta data for the local system 224 and the remote system 226, respectively) are readily accessible in the local system 224.

In an embodiment, data objects may be displayed in a viewer 220 connected to the viewer model 210 via an access path 219. In an embodiment, the viewer 220 may display data objects having both a local presence and a remote presence (i.e. a local data object and a corresponding remote data object). This is possible because the viewer model 210 has merged the meta data (local model 204 and remote model 206) for the local system 224 and the remote system 226. As will be explained, such a "local/remote" data object having both a local presence and a remote presence may have local and remote actions performed thereon in a context sensitive manner.

Illustrative examples of display of and interaction with local and remote data objects in the viewer 220, in accordance with exemplary embodiments of the invention, are now shown and described.

Figure 3A:
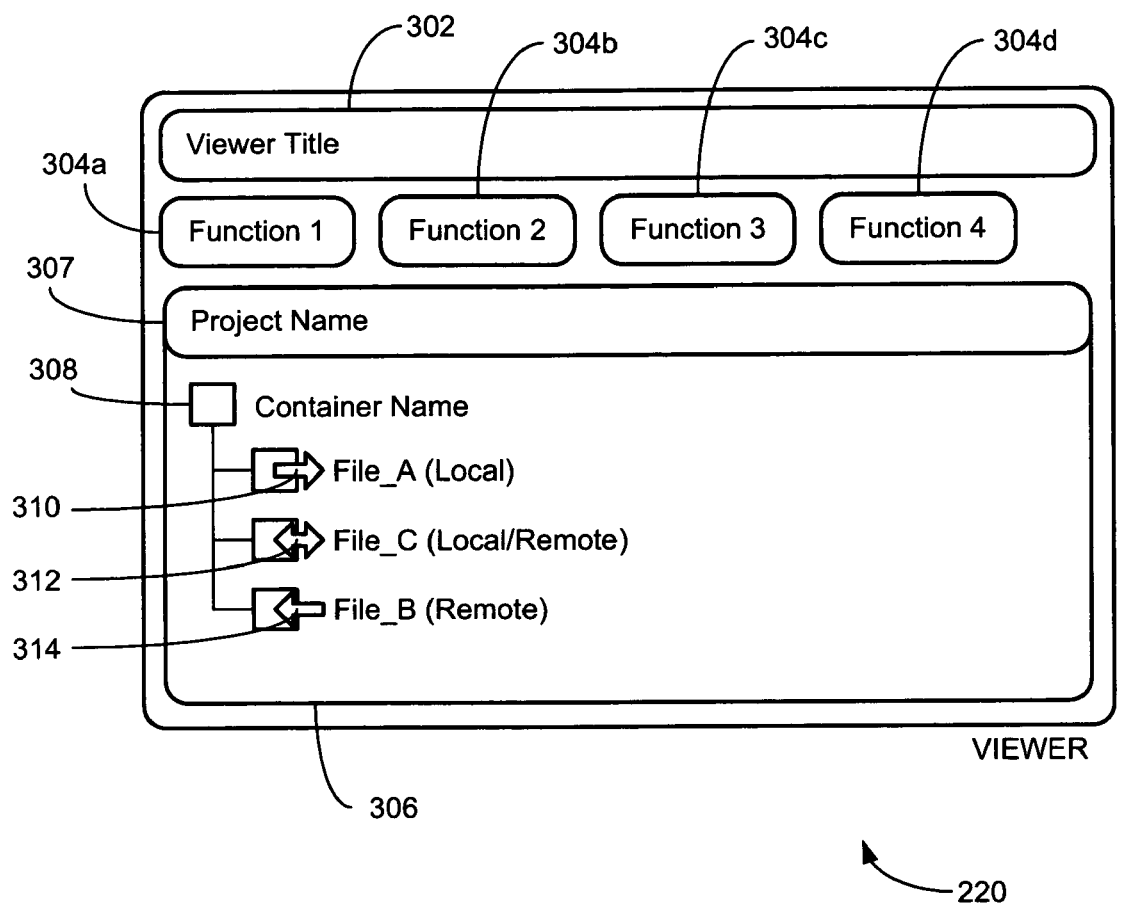
FIG. 3A shows an illustrative example of a data object viewer of FIG. 2 in accordance with an embodiment.

FIG. 3A shows the viewer 220 of FIG. 2 in accordance with an exemplary embodiment. As shown, the viewer 220 may be embodied as a graphical user interface having, for example, a viewer title 302, and a plurality of functions 304a-304d available from that view. For example, one of the functions 304a-304d may provide a drop down window (not shown) from which a "project" (e.g. a collection of folders and files) may be selected for view in the viewer 220. Other functions 304a-304d may control access to various application specific or operating system features or actions. For example, one of the functions 304a-304d may "refresh" the viewer 220 to update the status of data objects shown in the viewer 220, and another of the functions 304a-304d may perform a "synchronization" operation for a data object selected in the viewer 220.

In this illustrative example, "containers" and "files" relating to a "project" 307 may be displayed in a project window 306, in the viewer 220. A container 308 displayed in the project window 306 may contain a number of data objects (e.g. File_A, File_B, File_C), which may have a local presence, a remote presence, or both a local and a remote presence.

In this illustrative example, File_A is a local data object having a local presence only, as indicated for example by a "local" location arrow 310 pointing to the right. File_B is a remote data object having a remote presence only, as indicated for example by a "remote" location arrow 314 pointing to the left. File_C is both a local data object and a remote data object (i.e. File_C has both a local presence and a remote presence), as indicated for example by a double-headed "local/remote" location arrow 314 pointing both to the left and to the right.

It will be appreciated that, in addition to "location" arrows 310, 312, 314, any other suitable graphics or visually distinguishing features may be used to indicate their local, remote or local/remote character. For example, different colours or other graphics may be used to indicate the "location" or other status information for each of the data objects displayed in the viewer 220.

A viewer 220 such as that shown above may provide a user with added flexibility in interacting with and visualizing local and remote data objects, as discussed below.

Figure 3B:
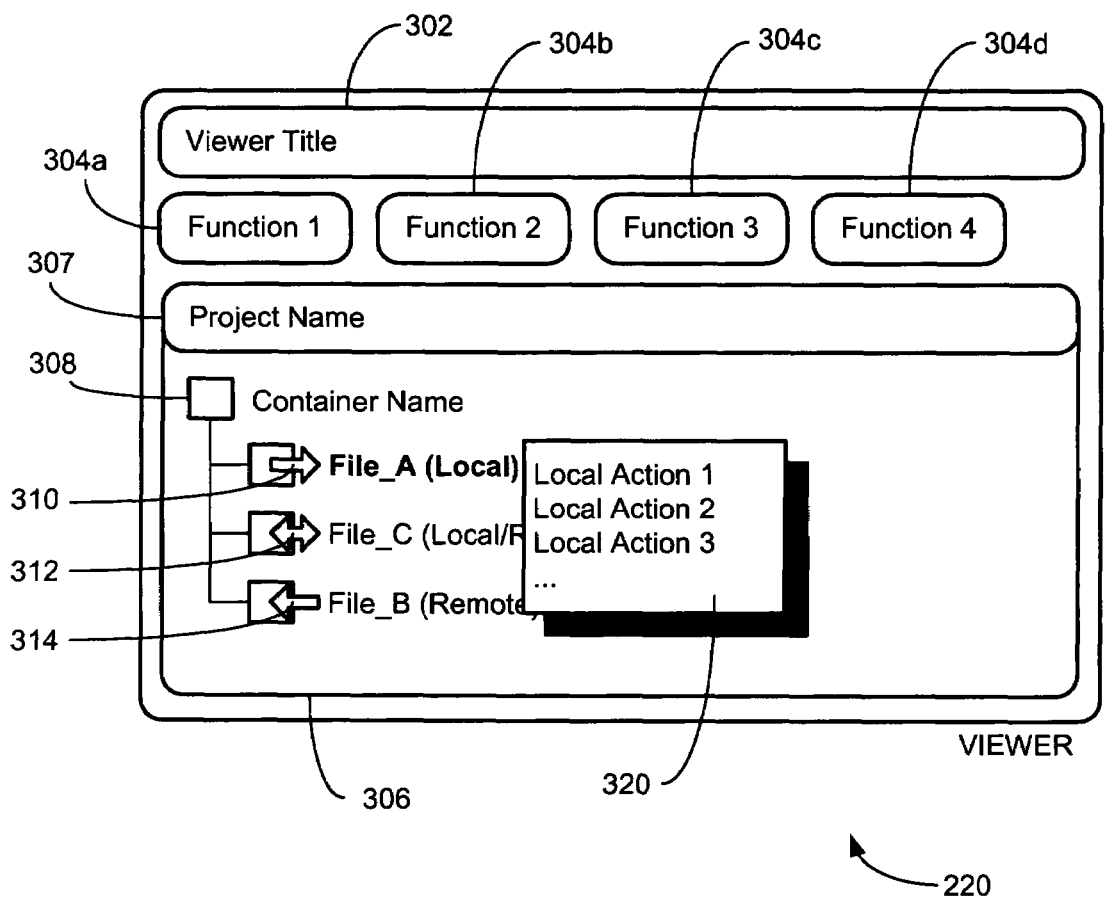
FIGS. 3B-3E illustrate various exemplary actions that may be performed on data objects selected in the viewer of FIG. 3A.

As illustrated in FIG. 3B, when a local data object such as File_A is selected by a user (the selection of File_A is indicated here by boldfacing), a window 320 may open which may provide the user with a list of local actions (e.g. Local Action 1, Local Action 2, Local Action 3 . . . ) that may be performed on the selected File_A. The list of valid local actions presented in the window 320 may be predefined in the local model 204 (FIG. 2) and merged to the viewer model 210 (FIG. 2).

In an embodiment, only valid local actions, which may be performed on File_A, may be presented for selection in the window 320. In another embodiment, invalid local actions may be shown but configured to be unselectable from the window 320.

Figure 3C:
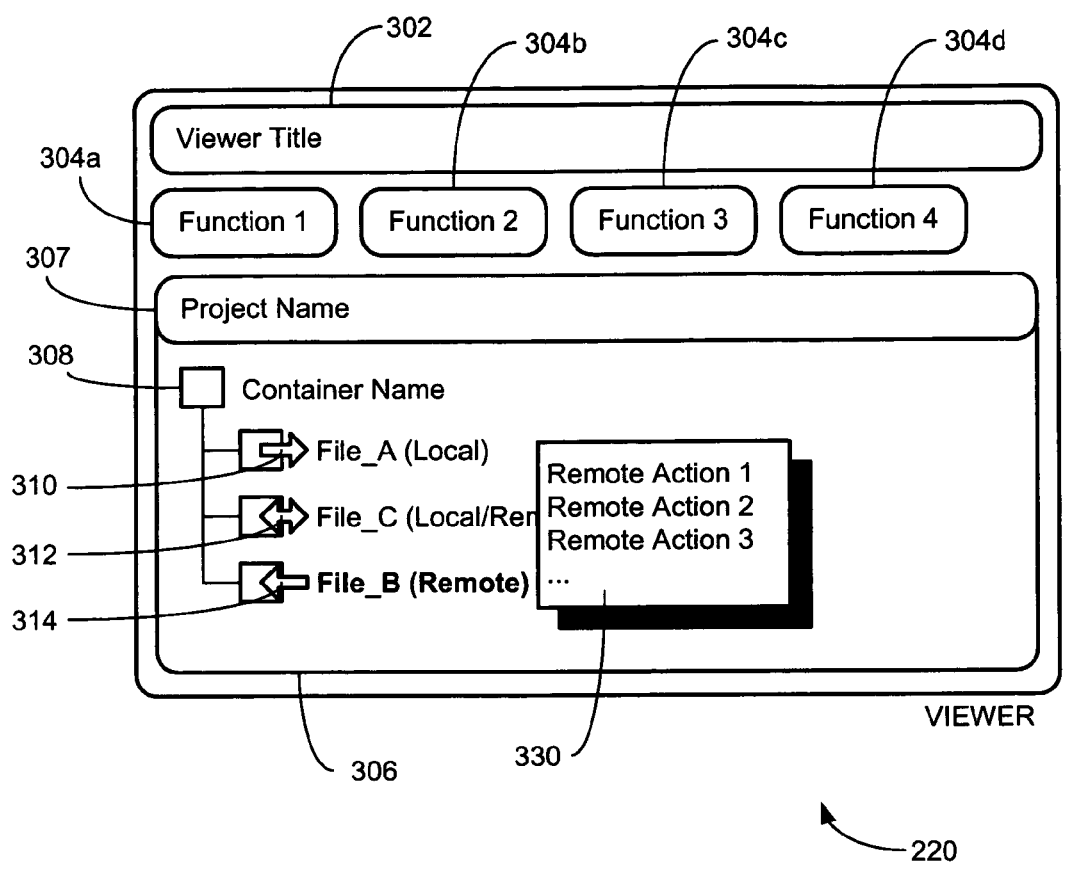

FIG. 3C illustrates another example in which File_B, a remote data object, is selected in the viewer 210 (the selection of File_B is indicated here by boldfacing). In this case, another window 330 may open which may provide the user with a list of remote actions (e.g. Remote Action 1, Remote Action 2, Remote Action 3 . . . ) which may be performed on the selected File_B. The list of valid remote actions presented in window 330 may be predefined in the remote model 206 (FIG. 2) and merged to the viewer model 210.

In an embodiment, only valid remote actions, which may be performed on File_B, may be presented for selection in the window 330. In another embodiment, invalid remote actions may be shown but configured to be unselectable from the window 330.

Figure 3D:
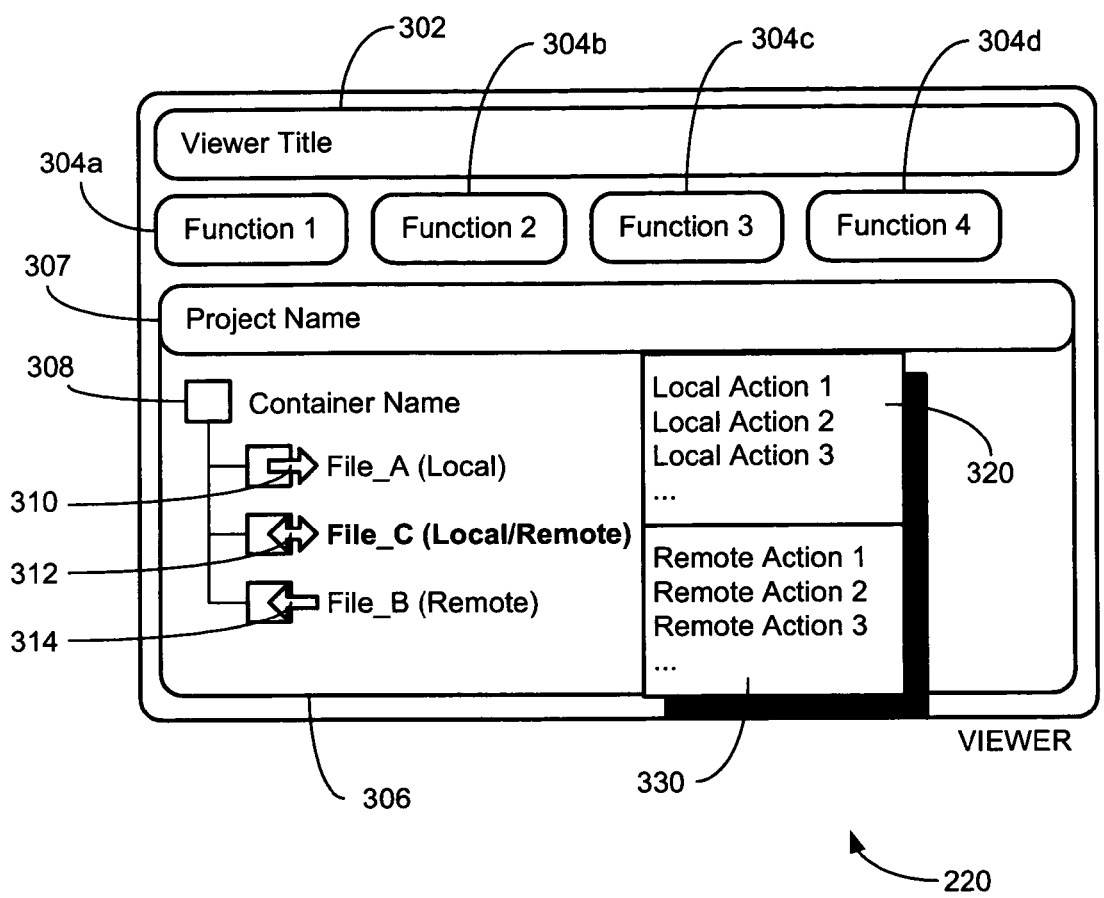

FIG. 3D illustrates yet another example in which File_C, both a local and a remote data object, is selected in the viewer 220 (the selection of File_C is indicated here by boldfacing). In this case, both windows 320 and 330 may open to provide the user with a list of local actions and a list of remote actions, respectively, which may be performed on File_C.

In an embodiment, only valid local or remote actions, which may be performed on File_C, may be presented in the windows 320, 330. In another embodiment, invalid actions may be shown but configured to be unselectable from the windows 320, 330.

In an embodiment, as the viewer model 210 merges both the local model 204 and the remote model 206, the viewer model 210 may be used to check whether local and remote actions may conflict with each other if performed together. If so, such actions may be made invalid by the viewer model 210 for affected local/remote data objects.

Figure 3E:
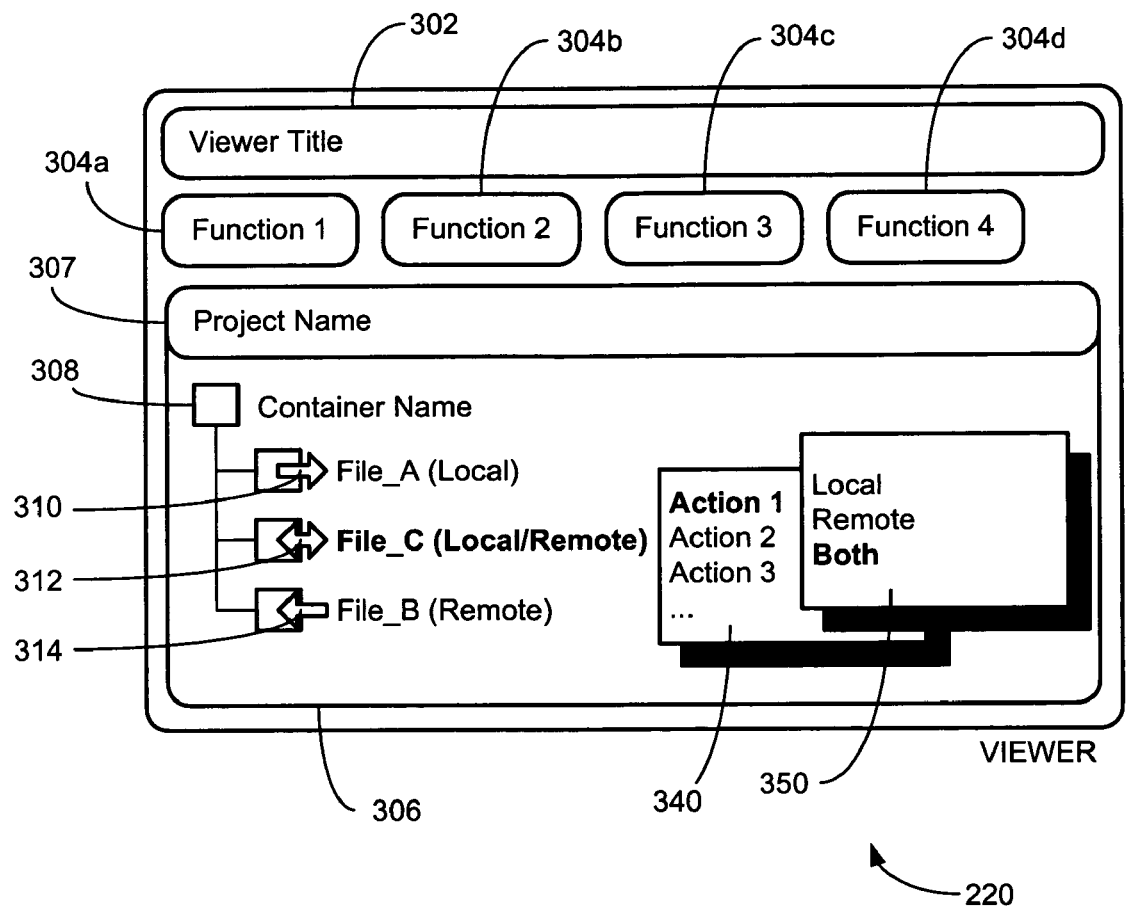

FIG. 3E illustrates yet another embodiment in which File_C is selected. As shown, instead of providing a list of local actions (window 320) and a list of remote actions (window 330) as in FIG. 3D, a combined action list (window 340) may be displayed. For example, the window 340 may present a selectable list of actions (e.g. Action 1, Action 2, Action 3) which may be performed on File_C.

In an embodiment, upon selection of an action in window 340, another window 350 may be presented which requires the user to further select whether the action should be performed only on the local presence (i.e. the local data object) of File_C, only on the remote presence (i.e. the remote data object) of File_C, or on both. In an embodiment, if an action selected in window 340 is not available for one or more of the local, remote and local/remote data objects, then such options may be shown but configured to be unselectable from the window 350.

As illustrated and described above, a user is able to interact with and visualize both local and remote data objects in a viewer in a flexible, context sensitive manner. In particular, for data objects having both a local presence and a remote presence (e.g. File_C above), the user is able to interact with both the local presence and the remote presence (i.e. both the local data object and the remote data object) of File_C in a context sensitive manner, substantially at the same time. Furthermore, when acting on a remote data object, or a local/remote data object, it is no longer necessary to be concerned about whether the remote data object needs to be pulled and turned into a local data object in order to be acted upon.

Furthermore, a user is able to interact with a local data model, a remote data model, or a local/remote data model with improved convenience, and without having to select or switch between different views containing only local data objects, or only remote data objects.

A system and model in accordance with an exemplary embodiment of the invention has been generally described above. Now, a more specific example is described using Unified Modeling Language (UML).

EXAMPLE

FIGS. 4A-4D illustrate, using UML, a specific implementation of an exemplary embodiment of the invention in an integrated software development environment ("IDE"). This specific implementation described below is illustrative, and is not meant to be limiting in any way.

In this specific implementation, a distributed data processing system (e.g. system 100 of FIG. 1) comprises a local system (e.g. local system 224) running WebSphere™ Development Studio Client for iSeries™ ("iSeries") and one or more remote systems 226 (e.g. servers 106a-106c) having one or more iSeries Remote Objects. A suitable communication path (e.g. network 102) connects the local system 224 to a targeted remote system 226.

As may be familiar to those skilled in the art, iSeries native development is often performed directly on an iSeries local system (e.g. workstation 104 of FIG. 1) since the tooling and the compilations is run there. However, in certain development situations, there is a need to recreate these tools remotely, and enhance their remote capabilities.

As explained earlier, a user is able to interact with and visualize both local and remote data objects by having a viewer model (i.e. viewer model 210 of FIG. 2) merge both an iSeries object model (i.e. local model 204 of FIG. 2) with an iSeries Remote Object model (i.e. remote model 206 of FIG. 2).

Figure 4A:
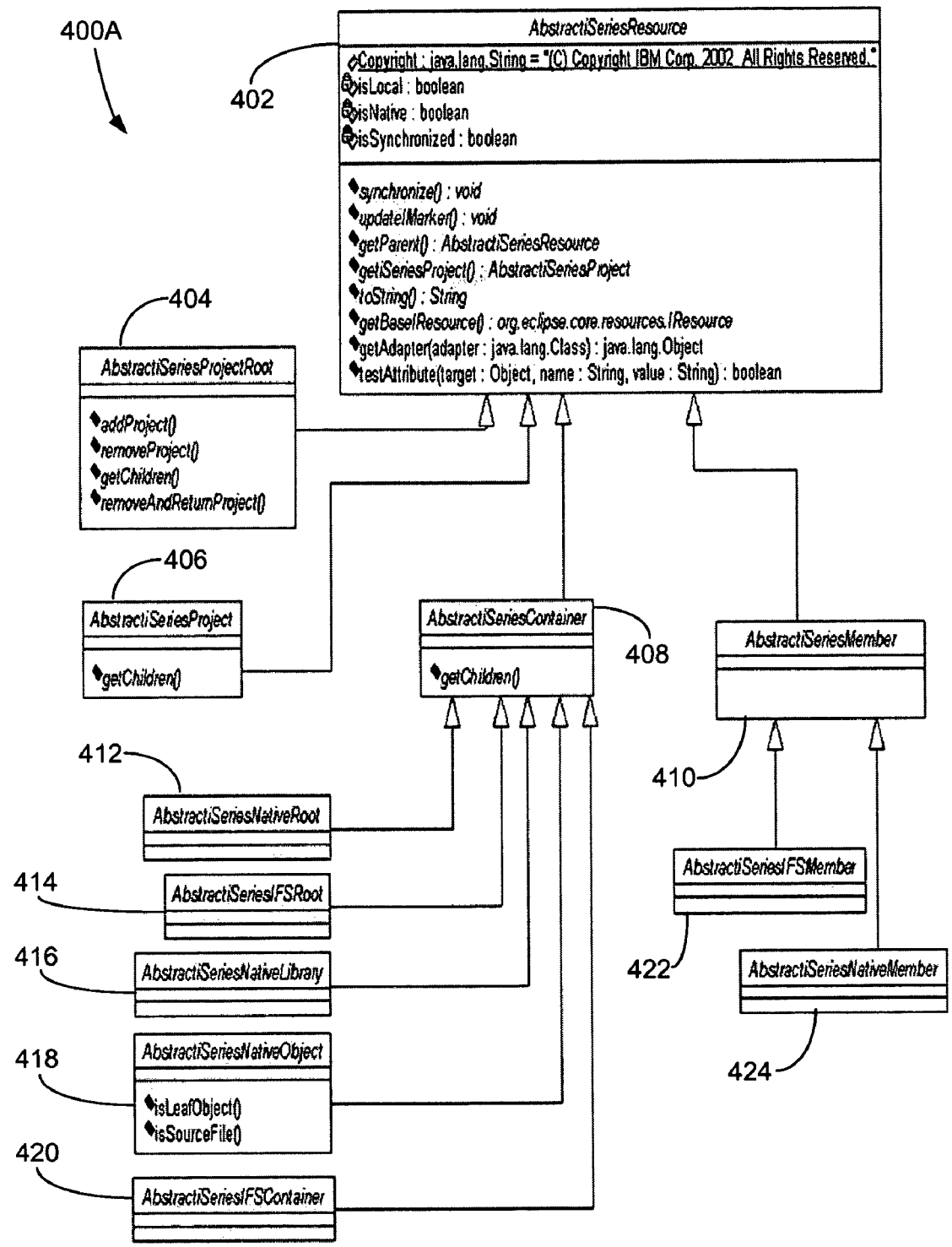
FIGS. 4A-4D show an illustrative data model in accordance with an exemplary embodiment using UML.

Using UML, FIG. 4A shows a number of "classes", some of which have defined "attributes" and "operations". As will be known to those skilled in the art, a UML "attribute" is a named property of a class that describes a range of values that instances of the property may hold. An attribute represents a property, which is shared by all objects of a class. Furthermore, a UML "operation" is an implementation of a service that can be requested from any object of the class to affect behavior. That is, an operation is an abstraction of something that can be done to an object that is shared by all objects of the class.

In FIG. 4A, class 402 ("AbstractiSeriesResource") is a "super class" or "parent" having a "generalization" relationship with a number of "children", i.e. class 404 ("AbstractiSeriesProjectRoot"), class 406 ("AbstractiSeriesProject"), class 408 ("AbstractiSeriesContainer"), and class 410 ("AbstractiSeriesMember"). As shown, class 408 is a parent and has generalization relationships with its children (classes 412-420), and class 410 is a parent and has generalization relationships with its children (classes 422 and 424). As will be familiar to those skilled in the art, in a "generalization" relationship, objects of the child may be used anywhere the parent may appear, and the child may inherit the attributes and operations of its parent (in some cases, a child may also have attributes and operations in addition to those found in its patent).

Figure 4B:
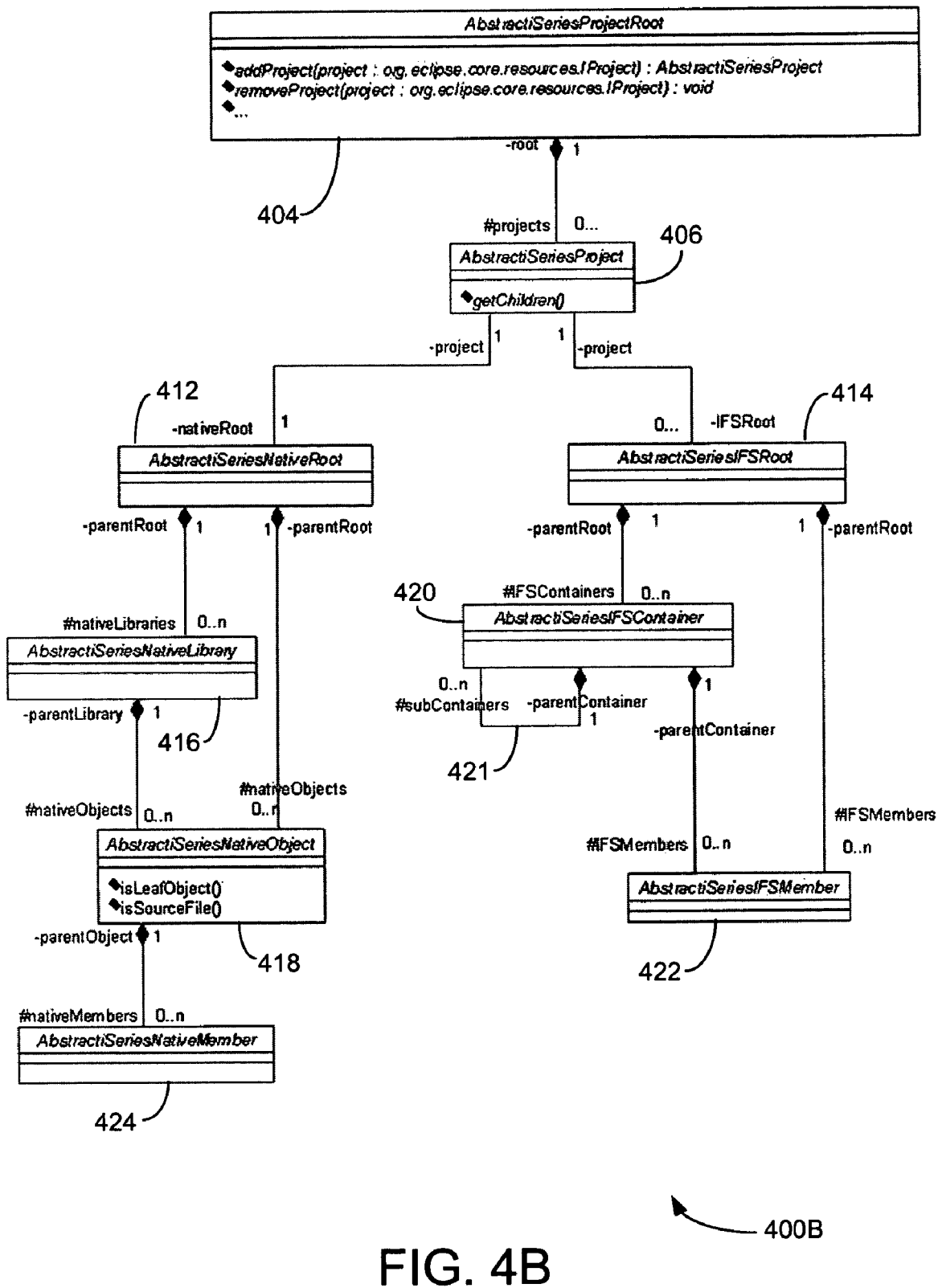
Figure 4C:
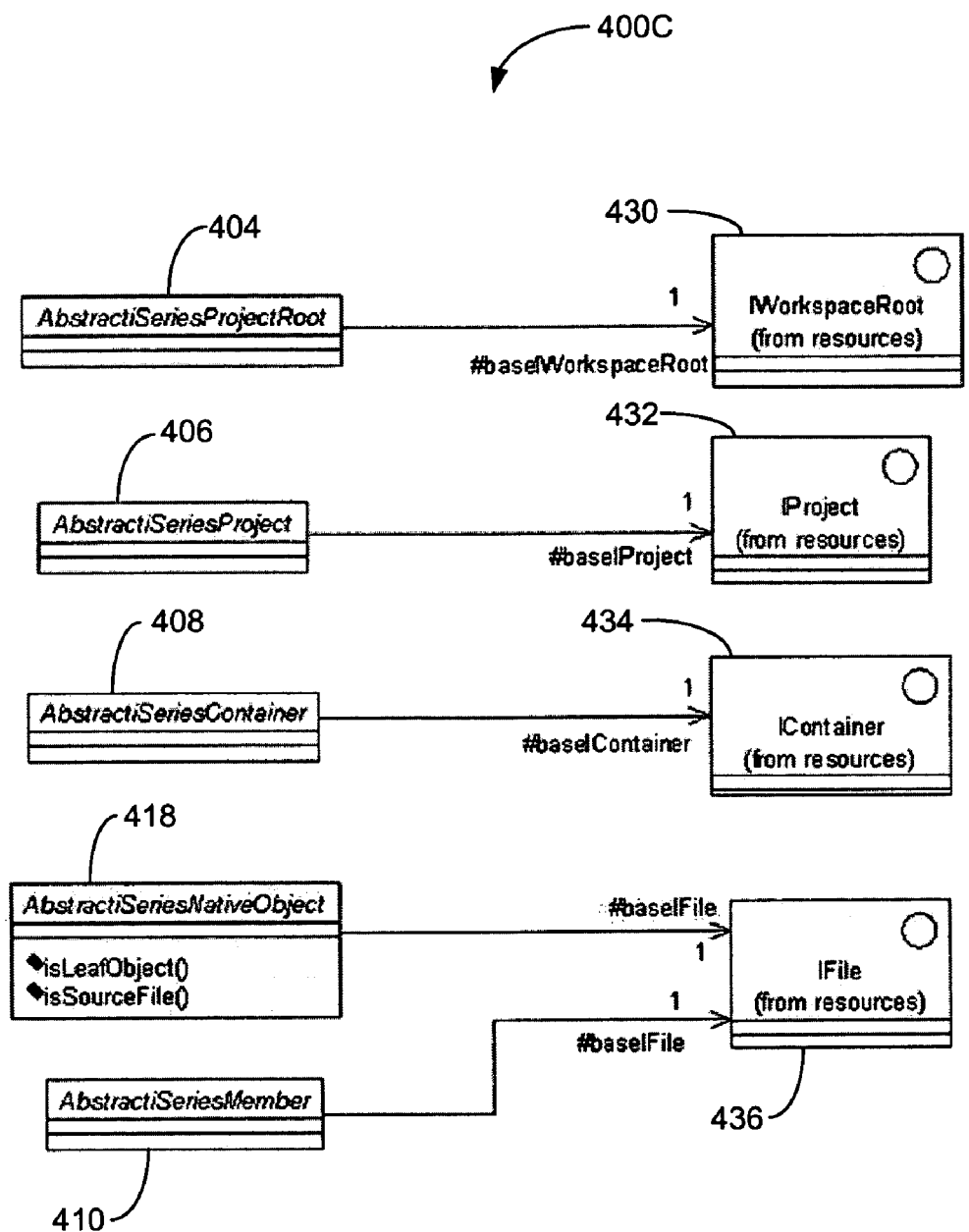
Figure 4D:
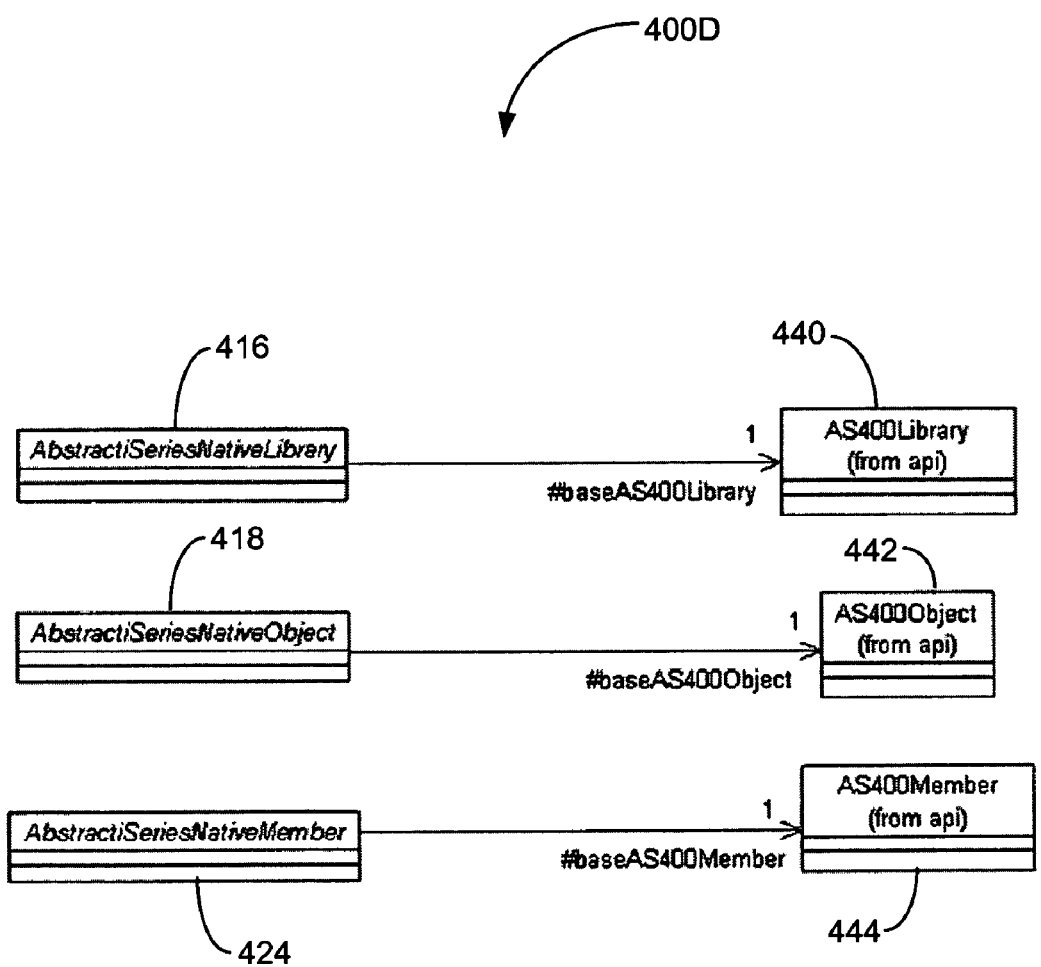

FIGS. 4B-4D detail relationships between various classes. From FIG. 4B, it is seen that a class 404 ("AbstractiSeriesProjectRoot") has an "aggregation" relationship with class 406 ("AbstractiSeriesProject"). As will be known to those skilled in the art, an "aggregation" is a "whole/part" kind of relationship in which one class represents a larger thing (the "whole"), which may consist of a number of smaller things (the "parts"). Thus, it may be said that class 406 is a "part" of class 404, or that class 404 "has" class 406.

Analogously, class 406 has a class 412 ("AbstractiSeriesNativeRoot"), and a class 414 ("AbstractiSeriesIFSRoot"). As known to those skilled in the art, IFS is a type of file system known as the "Integrated File system" and is a part of OS400, the operation system for the iSeries class of machines. Class 412 has further subclasses including class 416 ("AbstractiSeriesNativeLibrary") and class 418 ("AbstractiSeriesNativeObject"). In this example, class 418 is a part of both class 416 and class 412. Class 424 ("AbstractiSeriesNativeMember") is a part of class 418. Class 414 has a class 420 ("AbstractiSeriesIFSContainer") and a class 422 ("AbstractiSeriesIFSMember"). Class 422 is a part of both class 414 and class 420. As shown at 421, class 420 maybe a part of itself (e.g. a subcontainer or subfolder within a folder). For the purposes of the present discussion, only the left branch (i.e. class 412 and its parts) is considered. As will be appreciated by those skilled in the art, class 412 defines a type of file system including a "Root", a "Library", an "Object" and a "Member".

FIG. 4C shows a number of "Abstract . . . " classes 404, 406, 408, 410 and 418 on the left side of FIG. 4C representing classes in a merged viewer model (i.e. viewer model 210 of FIG. 2). These "Abstract . . . " classes 404, 406, 408, 410 and 418 have a one-way "association" with a number of "I . . . " classes on the right side of FIG. 4C representing "local" data objects. More specifically, class 404 is associated with class 430 ("IworkspaceRoot"), class 406 is associated with class 432 ("Iproject"), class 408 is associated with class 434 ("Icontainer"), and both class 418 and class 410 are associated with class 436 ("Ifile"). In the context of the present discussion, the "I . . . " classes 430, 432, 434, 436 represent the local model (e.g. local model 204 of FIG. 2) for a local system 224.

FIG. 4D shows a model 400D with other "Abstract . . . " classes 416, 418 and 424 on the left side of FIG. 4D having an "association" with a number of "AS400™ . . . " classes 440, 442, 444 on the right side of FIG. 4D. More specifically, class 416 is associated with class 440 ("AS400Library"), class 418 is associated with class 442 ("AS400Object"), and class 424 is associated with class 444 ("AS400Member"). In the context of the present discussion, the "AS400 . . . " classes 440, 442, 444 represent the remote model (e.g. remote model 206 of FIG. 2) for a remote system 226.

In an embodiment, the "Abstract . . . " classes shown in FIGS. 4C and 4D may represent two "wrapped" object models: (i) a "local" iSeries object model; and (ii) a "remote" iSeries Remote Object model. In an embodiment, data objects that are local, remote, or local/remote may all be handled by the merged viewer model (i.e. viewer model 210 of FIG. 2) as described above.

Advantageously, the caching of the local and remote object models into a merged viewer model may provide a user with increased flexibility in interacting with and visualizing local and remote data objects in a viewer.

In an IDE environment, for example, an executable local/remote data object displayed in the viewer 220 may be selected, compiled, and run without regard to whether the data object is a local data object, remote data object, or a local/remote data object (although this may be readily visualized in the viewer 220). If, for example, the compilation action is to be performed locally, and the running action is to be performed remotely, the user need not switch between views of local data objects only, or remote data objects only. Rather, both actions may be taken in a context sensitive manner by selecting the local/remote executable data object from one view, and by relying on the merged viewer model to perform the required actions.

Figure 5:
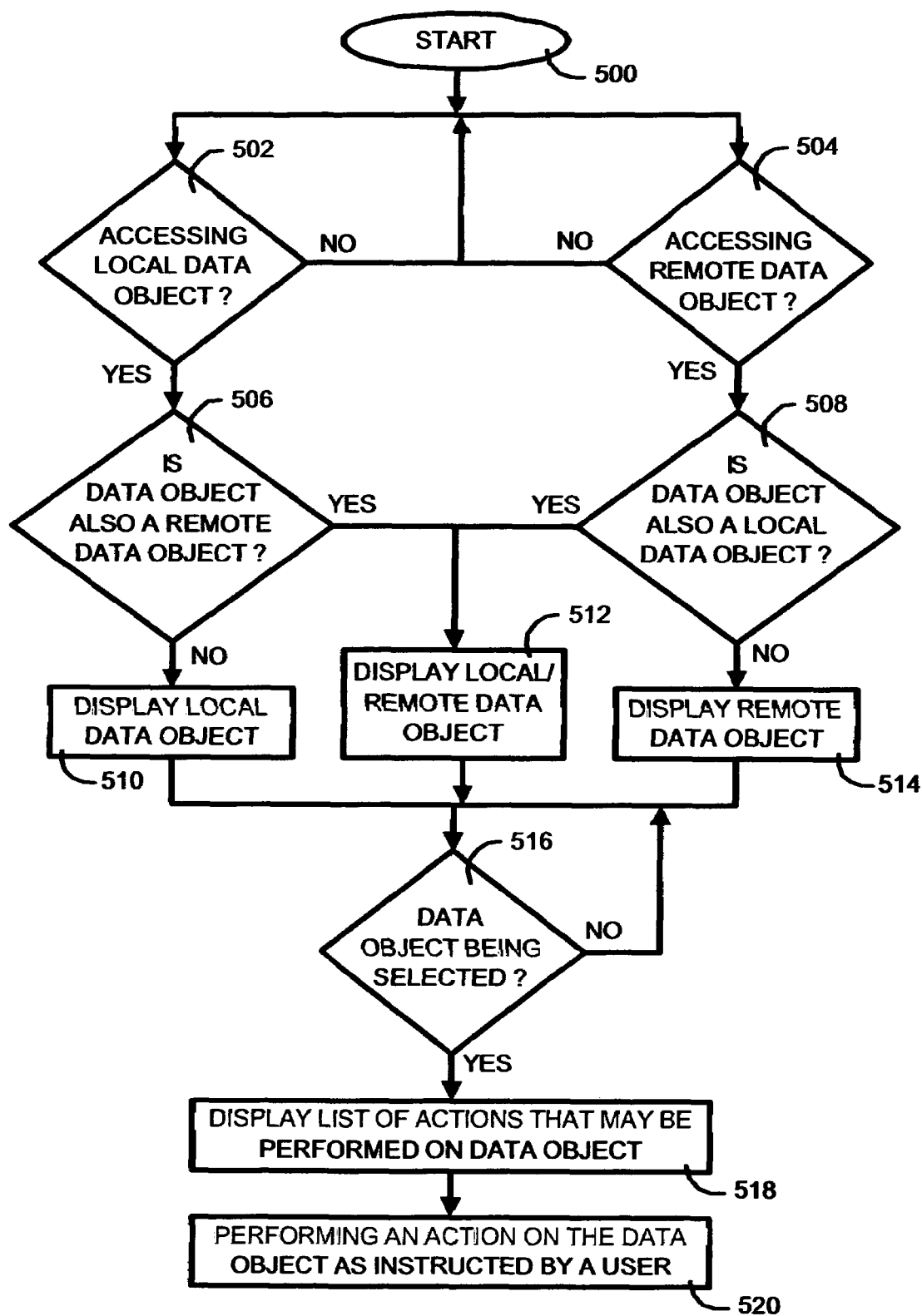
FIG. 5 is a flowchart of a process that may be used to implement the invention.

FIG. 5 is a flowchart of a process that may be used to implement the invention. The process starts at step 500. There a check is continuously being made to determine whether a local data object or a remote data object is being accessed. If not, the process returns to step 500.

If a local data object is being accessed (step 502), then at step 506 another check is made to determine whether the local data object is a hybrid data object (i.e., the data object has both a local presence and a remote presence e.g., it is both a local and a remote data object). If the data object is not a hybrid data object, then the local data object is displayed (step 510). If the data object is a hybrid data object, then the hybrid data object is displayed (step 512). Note that all local data objects and/or hybrid data objects on a local system may be displayed at once on the local system.

Likewise, if a remote data object is being accessed (step 504), then at step 508 another check is made to determine whether the remote data object is a hybrid data object (i.e., the data object is both a local data object and a remote data object). If the data object is not a hybrid data object, then the remote data object is displayed (step 514). If the data object is a hybrid data object, then the hybrid data object is displayed (step 512). Again, note that all remote data objects and/or remote hybrid data objects on a remote system may be displayed at once on a local system.

Note further that if local, hybrid and remote data systems are displayed simultaneously on a local system (which may happen if a user successively accesses both a local data object and a remote data object on a local system) each data object will be displayed with an indication as to whether it is a local, remote or hybrid data object.

After displaying a data object, a check is continuously being made to determine whether the displayed data object is selected (step 516). If so, a list of actions that may be performed on the selected data object is displayed. Obviously, if the selected data object is a local data object then all the actions listed will be local actions. If, on the other hand, the selected data object is a remote data object, then all the actions listed will be remote actions. If the selected data object is a hybrid data object then the listed actions will be both local and remote actions. In this case, the invention may perform a further test to determine which actions interfere with which other actions. The interfering actions may not be listed or may be listed in a disabled state.

When one of the listed actions is selected, the action will be performed on the selected data object (step 520). That is, if the action is to be performed on a local data object, the action will be performed locally. If the action is to be performed on a remote data object, the action will be performed remotely. If the action is to be performed on a hybrid data object, a user may be prompted for an indication as to whether the action is to be performed locally (i.e., on the local presence of the data object) or remotely (i.e., on the remote presence of the data object). Once the indication is received, the action will then be performed accordingly.

While exemplary embodiments of the invention have been described, and a specific implementation has been presented, it will be apparent to those skilled in the art that various changes and modifications may be made without departing from the spirit and scope of the invention.

For example, the IDE product described in the specific implementation presented above may be viewed as providing only a set of re-usable APIs. It will be appreciated that the teaching of the present invention may be embodied in numerous other data processing environments and programming languages. For example, the C++ language or other similar object oriented programming language may be used to program the behaviors described.

Also, while a merged "viewer model" 210 (FIG. 2) has been shown and described, it will be appreciated that, in an alternative embodiment, a process may access both the local model 204 (FIG. 2) and the remote model 206 (FIG. 2) in each instance in order to display and allow actions to be taken on local/remote data objects in the viewer 220.

Thus, the scope of the invention is limited only by the language of the following claims.

The embodiments of the invention which an exclusive property or privilege is claimed are define as follows:

1. A method of interacting with locally and remotely stored data objects in a distributed data processing system, comprising:
    determining whether a data object is stored on both a remote system in the distributed data processing system and a local system;
    displaying on the local system, if it is determined that the data object is stored on both the local system and the remote system in the distributed data processing system, the data object as a hybrid data object, the hybrid data object representing both the data object stored on the local system and the data object stored on the remote system;
    enabling a user on the local system to perform an action on the hybrid data object by first selecting the hybrid data object;
    prompting the user, in response to the user selecting the hybrid data object, to indicate whether the action is to be performed on the data object stored on the local system, the data object stored on the remote system, or both the data object stored on the local system and the data object stored on the remote system; and
    performing the action as indicated by the user.

2. The method of claim 1 wherein locally stored data objects and remotely stored data objects are displayed in conjunction with the hybrid data object.

3. The method of claim 2 wherein in response to the user selecting a data object on which to perform an action, a list of actions is displayed, the list of actions including all actions that can be performed on the selected data object.

4. The method of claim 3 wherein when the data object selected is a locally stored data object, the list of actions displayed is a list of local actions.

5. The method of claim 3 wherein when the data object selected is a remotely stored data object, the list of actions displayed is a list of remote actions.

6. The method of claim 3 wherein when the data object selected is the hybrid data object, the list of actions displayed is a list of both local and remote actions.

7. A method of enabling a user on a local system to interact with shared data objects in a distributed data processing system, comprising:
    determining whether each shared data object is stored on the local system, a remote system or both the local system and the remote system in the distributed data processing system;
    displaying on the local system the shared data objects, each shared data object being displayed as a local data object if it is determined that the data object is stored on the local system, a remote data object if it is determined that the shared data object is stored on the remote system or a hybrid data object if it is determined that the data object is stored on both the local system and the remote system;
    enabling the user to perform an action on a shared data object by first selecting a displayed data object representing the shared data object;
    prompting the user, if the displayed data object selected is a hybrid data object, to indicate whether the action is to be performed on the data object stored on the local system, the data object stored on the remote system, or both the data object stored on the local system and the data object stored on the remote system;
    displaying a list of actions that can be performed on the selected data object after the user selects the displayed data object or after the user indicates whether the action is to be performed on the data object stored on the local system, the data object stored on the remote system, or both the data object stored on the local system and the data object stored on the remote system if the selected data object is a hybrid data object; and
    performing the action as indicated by the user.

* * * * *